United States Patent
Hopkins et al.

(10) Patent No.: US 6,331,682 B1
(45) Date of Patent: Dec. 18, 2001

(54) TANK WEIGH MODULE WITH EXCESS MOTION RESTRAINT

(75) Inventors: Randall K. Hopkins, Mendon; Thomas W. Hansson, Natick, both of MA (US)

(73) Assignee: Hottinger Baldwin Measurements, Inc., Marlboro, MA (US)

( * ) Notice: Subject to any disclaimer, the term of this patent is extended or adjusted under 35 U.S.C. 154(b) by 0 days.

(21) Appl. No.: 09/483,612

(22) Filed: Jan. 14, 2000

Related U.S. Application Data

(60) Provisional application No. 60/116,638, filed on Jan. 21, 1999.

(51) Int. Cl.[7] .................................................. G01G 23/02
(52) U.S. Cl. ........................................... 177/154; 177/155
(58) Field of Search ..................................... 177/154, 155, 177/156, 157, 158, 159

(56) References Cited

U.S. PATENT DOCUMENTS

| | | | |
|---|---|---|---|
| 3,354,710 | 11/1967 | Johnson | 177/154 |
| 3,997,014 | 12/1976 | Soderholm et al. | 177/154 |
| 4,095,659 * | 6/1978 | Blench et al. | 177/154 |
| 4,467,661 | 8/1984 | Somal | 177/154 |
| 4,726,435 | 2/1988 | Kitagawa et al. | 177/154 |
| 5,111,896 | 5/1992 | Porcari et al. | 177/154 |
| 5,319,161 | 6/1994 | Miller et al. | 177/154 |
| 5,591,944 | 1/1997 | Meyer | 177/154 |

* cited by examiner

*Primary Examiner*—Randy W. Gibson
(74) *Attorney, Agent, or Firm*—W. F. Fasse; W. G. Fasse

(57) ABSTRACT

A tank weigh module includes a bottom plate that has two lower stop blocks protruding upwardly therefrom, and a top plate that has an upper stop block protruding downwardly therefrom into a space between the two upper stop blocks with a block free play clearance therebetween. A restraining pin is arranged to extend through aligned pin receiving holes in all of the stop blocks. In the lower stop blocks, the holes provide a tight friction fit for the pin, while the hole in the upper stop block has a larger diameter and provides a pin free play clearance. Motion of the top plate relative to the bottom plate in the back-and-forth Y-direction is limited to the extent of the block free play clearance. Travel of the top plate in the side-to-side X-direction and in the uplift Z-direction is restrained by the extent of the pin free play clearance. Tilting and twisting about the X-, Y-, and Z-axes are also limited by the pin interacting with the blocks and the blocks interacting with each other. A load cell is secured in position between the top and bottom plates by two fixed securing pins and a third removable securing pin attached to the bottom plate, whereby the securing pins are angularly offset by 120° from each other. The weigh module has a simple construction, installation, and servicing, and provides protection against excess uplift, side loading, and tilting while allow complete free floating operation in a normal operating range.

20 Claims, 6 Drawing Sheets

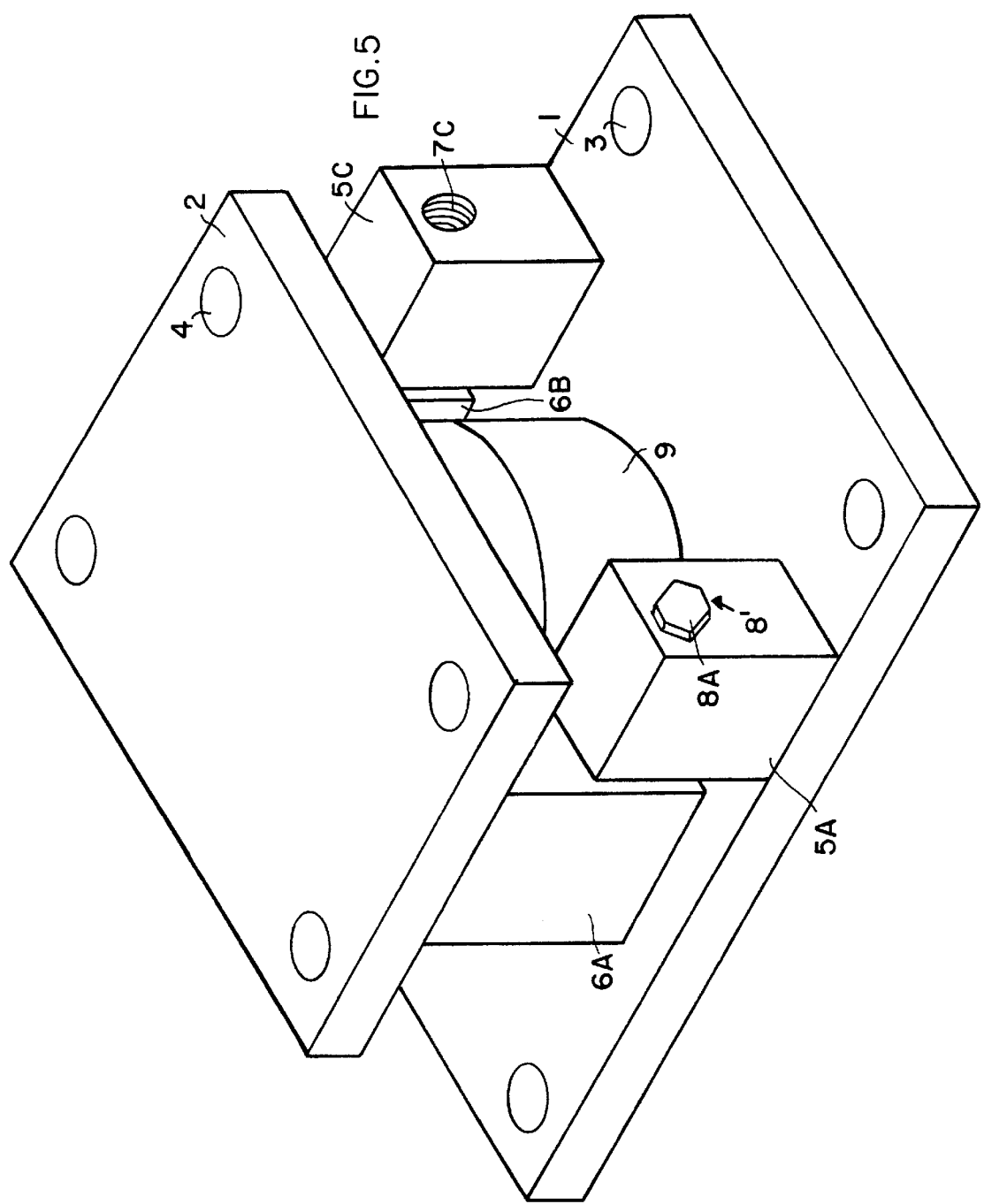

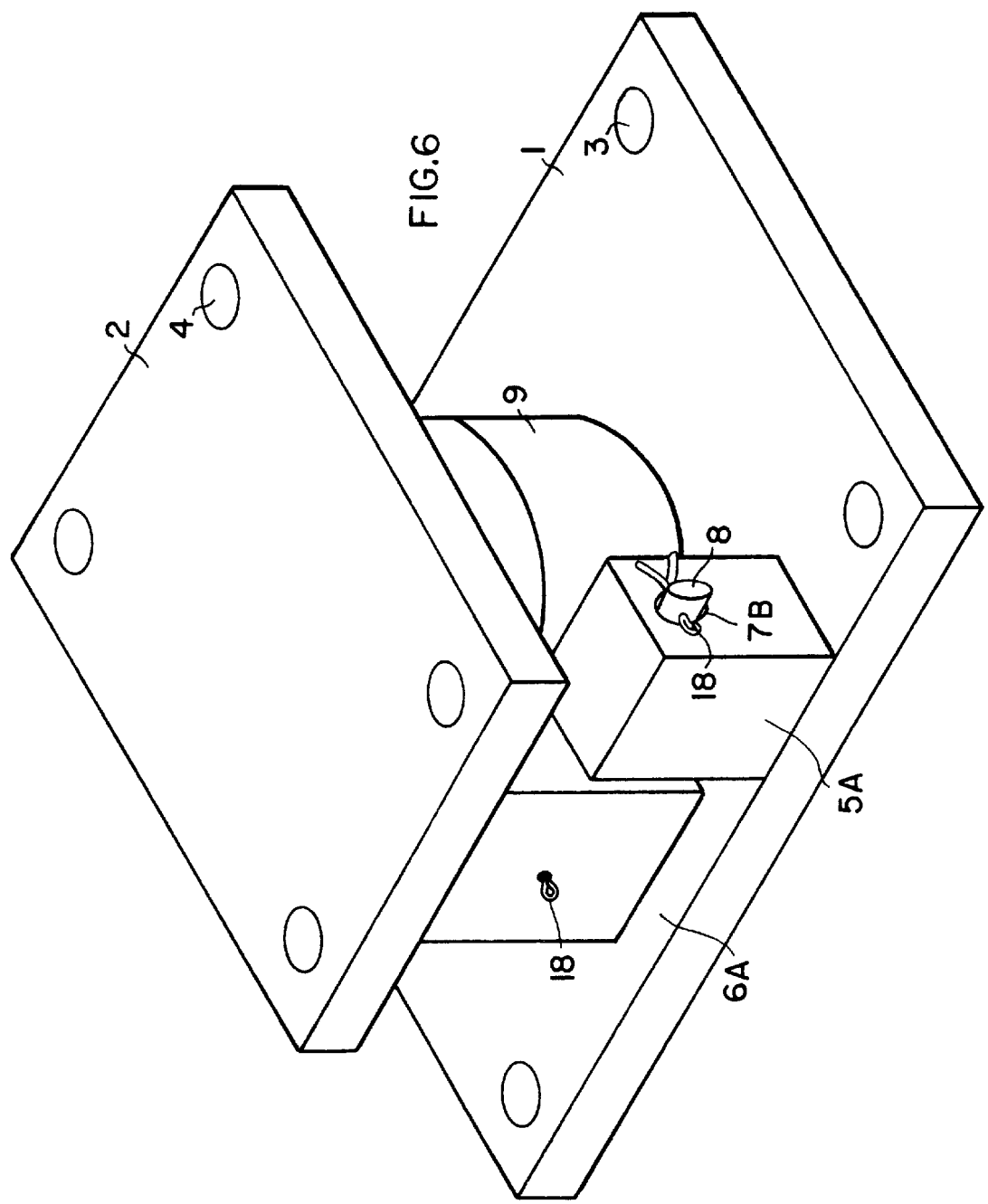

TANK WEIGH MODULE WITH EXCESS MOTION RESTRAINT

PRIORITY CLAIM TO PROVISIONAL APPLICATION

This application is related to and claims the benefit under 35 U.S.C. §119(e)(1) of prior copending U.S. Provisional Application 60/116,638 filed on Jan. 21, 1999.

FIELD OF THE INVENTION

The invention relates to a tank weigh module that is adapted to receive a load cell and that is provided with restraint features for preventing excess motion of the weigh module or the tank or other vessel mounted on the weigh module.

BACKGROUND INFORMATION

Tank weigh modules are generally known in the art for weighing material storage tanks, bins, hoppers and process vessels, so that the amount of material in the vessel can be determined. Typically, the entire weight of a tank or other vessel will be supported on three or four weigh modules respectively arranged between the three or four supporting legs of the vessel and the shop floor or other supporting platform. A typical tank weigh module is, in effect, a housing and interface adapted to receive a load cell and transmit the weight load of the vessel onto the load cell, which then carries out the weighing function. A conventional tank weigh module includes a base that can be bolted to the supporting floor, and a top plate that can be bolted to the supporting leg of a tank. The load cell is arranged between the base and the top plate to receive and measure the weight load. A rocker pin may be used for load introduction into the load cell while rejecting side or lateral loading.

It is also known to provide various restraining structures and arrangements to check or prevent an excessive motion between the base and the top plate of the weigh module. Such checking or excess motion restraint is necessary for maintaining the structural integrity of the weigh module in the event that an excessive travel or other unusual motion is applied to the top plate of the weigh module by the tank or other vessel. For example, if the vessel is subjected to wind loading, seismic tremors, or other forces that would cause a swaying or tilting of the tank, then the weigh modules arranged on one side of the tank are subjected to an excessive downward travel while the weigh modules arranged on the other side of the tank are subjected to an excessive uplift travel. Under such circumstances, the weigh modules may also be subjected to tilting or twisting motions. If such unusual and excessive motion is not checked or restrained, then the tank or other vessel could tip over. For this reason, conventional tank weigh modules typically include various complicated configurations of overlift restraint bolts, check rods, stay rods, restraining dogs or protrusions, and the like.

The conventional provision of the above mentioned check rods, stays, overlift protection bolts, and the like has caused several disadvantages in the known tank weigh modules. Most importantly, the overall construction of the conventional tank weigh modules has become rather complicated and costly due to the various restraining measures. Furthermore, the installation and servicing of the conventional tank weigh modules has also become complicated for the following reasons. First, the various restraining measures often need to be adjusted or installed after installation of the tank weigh module in its final intended application. Secondly, the restraining measures hinder or prevent access to the load cell, so that replacement of the load cell in the event of a failure requires a complete removal and disassembly of the tank weigh module. Finally, at least some conventional tank weigh modules are regarded as providing inadequate restraint or protection against overlift, tilting, and side loading conditions.

SUMMARY OF THE INVENTION

In view of the above, it is an object of the invention to provide a tank weigh module that has a simplified overall structure in comparison to the prior art tank weigh modules, and that has a simplified and improved structural arrangement for achieving restraint and protection against excess motion in overlift, side load, and tilting situations. It is a further object of the invention to provide an improved and simplified arrangement for mounting and securing a load cell into a weigh module. The invention further aims to avoid or overcome the several disadvantages of the prior art, and to achieve additional advantages, as apparent from the present specification.

The above objects have been achieved in a tank weigh module according to the invention, comprising a top plate member, a bottom plate member, and a stop pin or restraining pin that interconnects the top plate member and the bottom plate member to each other with a desired amount and direction of play between the top and bottom plate members. The plate members are spaced apart from each other and adapted to receive a load cell there-between. Particularly, the top plate member includes a top plate and an upper stop block protruding downwardly therefrom, while the bottom plate member includes a bottom plate and a lower stop block protruding upwardly therefrom. A respective bore hole extends substantially horizontally through the lower stop block and the upper stop block, and the restraining pin is received in the two aligned bore holes. One of the bore holes has an appropriate diameter for receiving the restraining pin in a fixed friction-fitting manner, while the other one of the bore holes has a larger diameter than the restraining pin, so as to provide a free play clearance around the pin. For example, the pin is received in the lower stop block with a tight friction fit, while being received in the upper stop block with a loose fit providing a free play clearance. A second free play clearance is provided laterally between the respective mutually opposed facing sides of the upper and lower stop blocks.

With the above arrangement, the top plate remains freely floating in all directions relative to the bottom plate in a normal operating range of motion, whereby the weight load applied to the top plate is transmitted into the load cell and from the load cell into the bottom plate, so that the load cell can carry out its weighing function. However, if an excessive uplift motion in the vertical direction or an excessive lateral motion in a first horizontal direction is applied to the top plate relative to the bottom plate, in excess of the range of motion allowed by the pin free play clearance, then the restraining pin will positively check and prevent any further motion in these directions by coming into contact with the interior bore walls of the larger diameter bored hole in the associated stop block. An excessive lateral motion in a second horizontal direction perpendicular to the first horizontal direction will be blocked or restrained by the respective upper and lower stop blocks coming into contact with each other.

Excessive tilting motions are restrained either by providing at least two restraining pins received in respective stop blocks in a single weigh module, and/or by the mutual cooperation of at least two tank weigh modules mounted on any given tank, and/or by the restraining interaction of the one or more restraining pins and the associated stop blocks, depending on the particular embodiment or configuration of the weigh module and depending on the direction of the excessive twisting or tilting. Moreover, the free play clearance of the pin in the larger diameter hole in one of the stop blocks, and the free play clearance of the adjacent stop blocks relative to each other allows a side-to-side and back-and-forth free floating of the top plate of the weigh module, for example to accommodate thermal expansion of the tank. However, an excessive side-to-side or back-and-forth motion will be prevented or restrained as described above, in one direction by the restraining pin bearing against the inner wall of the larger diameter hole, and in another direction by the two adjacent stop blocks bearing against each other. The relative positions of the top and bottom plates with respect to each other, within the range of motion allowed by the restraining features, will be regarded as "substantially parallel" herein, which encompasses deviations from true parallelism in the allowed range of motion.

The arrangement of blocks connected respectively to the top and bottom plates, and the restraining pin arranged in pin receiving holes provided in the blocks is a very simple structural solution to the problem of providing a free floating characteristic in all directions over a limited range of motion, while also providing a restraint against excess motion in all directions. The weigh module can be completely pre-assembled and configured for the end users particular specifications, without requiring any field assembly or field adjustment of the restraining arrangement. The arrangement may be locked in the full up-lift position by inserting a shipping chock, which also serves to protect the load cell during shipment. To install the weigh module, the module is simply bolted to the supporting floor and to the tank leg, and then the shipping chock is removed.

The inventive weigh module also allows especially easy access to and removal of the load cell. To achieve this, the load cell is secured in place by three securing pins that are angularly spaced from each other respectively by 120° about a center axis of the load cell. Two of the load cell securing pins are rigidly fixed, while the third is an easily removable two-part wedge-action pin that releasably wedges or clamps the load cell against the two other pins. Replacement of the load cell simply requires jacking up the top plate of the module (after removal of the restraining pin in preferred configurations), then removing the two-part wedge-action load cell securing pin, and sliding the load cell out of the module. A new load cell is installed by reversing the preceding steps.

Another advantageous feature of the invention is that a rocker pin is used to introduce the load from the top plate into the load cell. This rocker pin, in combination with the excess tilting restraint, minimizes or eliminates lateral force loading onto the load cell.

BRIEF DESCRIPTION OF THE DRAWINGS

In order that the invention may be clearly understood, it will now be described in connection with example embodiments, with reference to the accompanying drawings, wherein:

FIG. 5 is a schematic perspective view of a further embodiment of a tank weigh module according to the invention; and FIG. 6 is a schematic perspective view of yet another embodiment of a tank weigh module according to the invention.

DETAILED DESCRIPTION OF PREFERRED EXAMPLE EMBODIMENTS AND OF THE BEST MODE OF THE INVENTION

Figure 1:
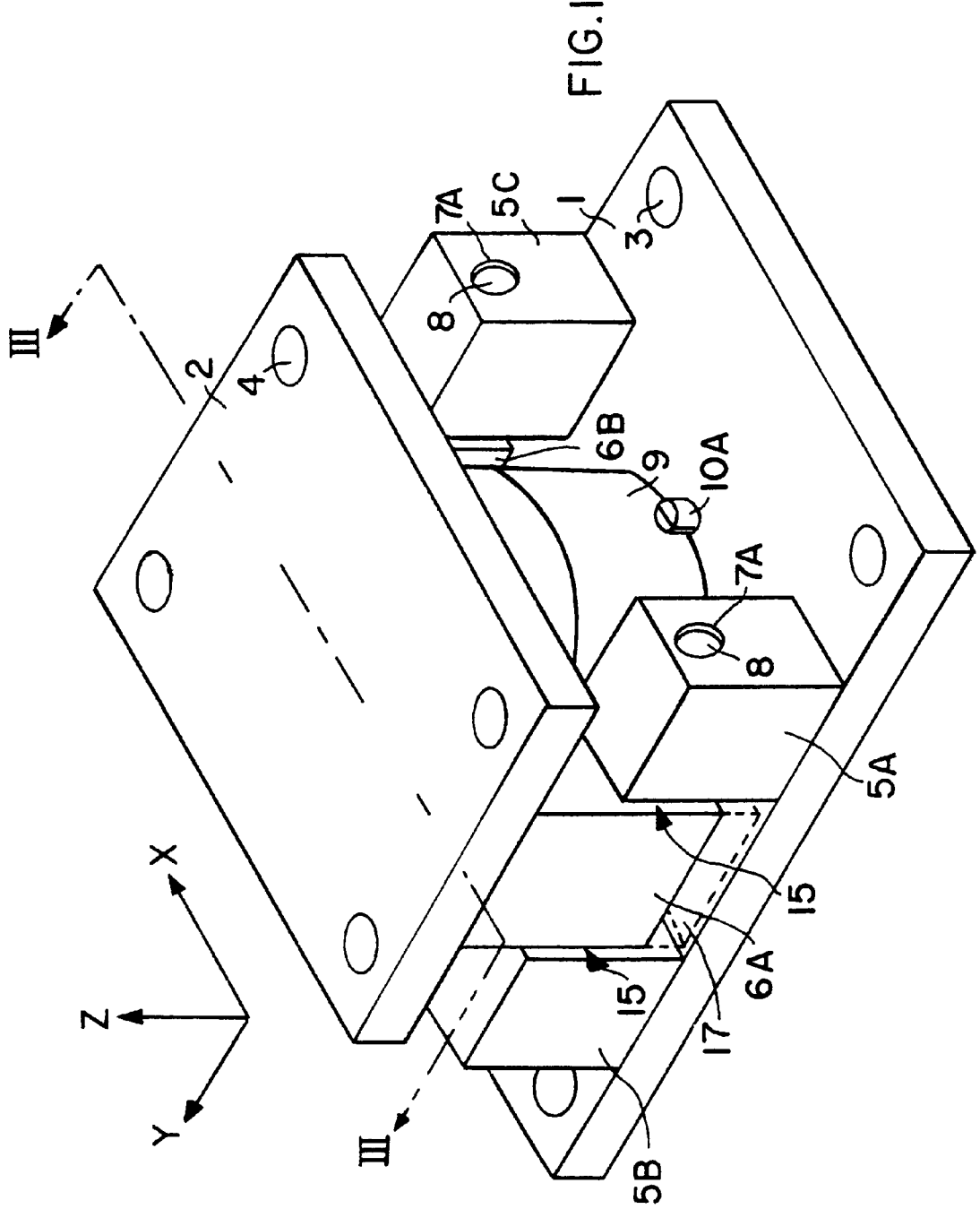
FIG. 1 is a schematic perspective view of a first embodiment of a tank weigh module according to the invention.
Figure 2:
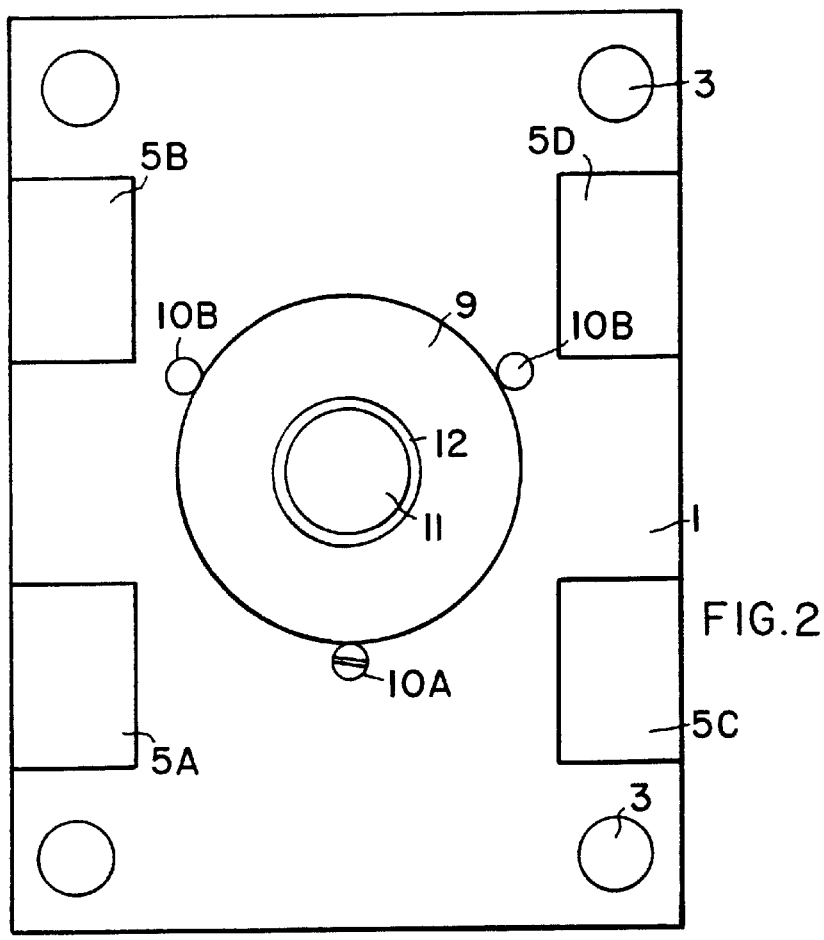
FIG. 2 is a schematic top view of the tank weigh module according to FIG. 1, whereby the top plate has been removed for clarity.
Figure 3:
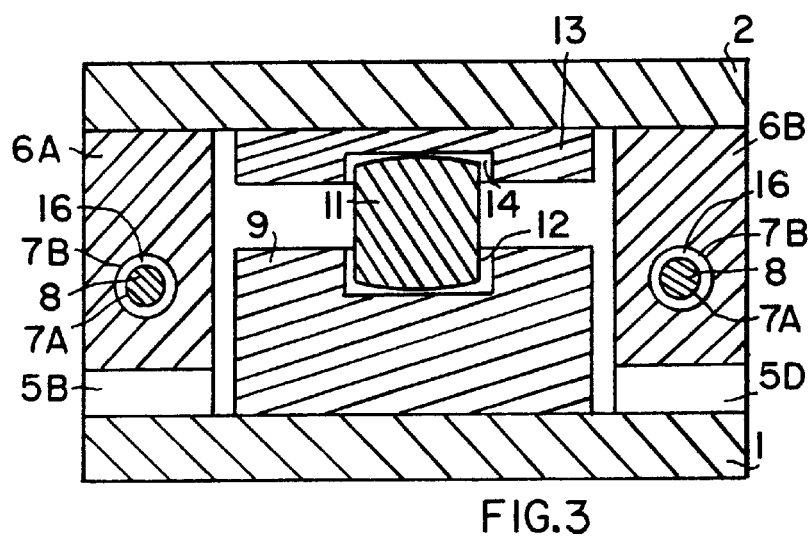
FIG. 3 is a schematic cross-section through the tank weigh module according to FIG. 1, as seen along the section line III—III of FIG. 1.

With reference to FIGS. 1, 2 and 3, a first embodiment of a tank weigh module according to the invention includes a bottom plate 1 and a top plate 2 positioned substantially parallel to each other and spaced apart from each other, and adapted to receive a load cell 9 between the two plates 1 and 2. The bottom plate 1 has mounting holes 3 by which the plate 1 may be bolted to a supporting floor or the like. The top plate 2 has mounting holes 4 by which the plate 2 may be bolted to a supporting leg of a tank or other vessel, or any other item that is to be weighed. Typically, three or four of the present tank weigh modules will respectively be arranged and secured under the three or four legs of a tank or other vessel.

In order to provide the inventive free-floating, yet restrained connection between the top plate 2 and the bottom plate 1, the present embodiment comprises four lower stop blocks 5A, 5B, 5C and 5D connected (preferably welded) to the bottom plate 1 so as to protrude upwardly from the bottom plate 1, and two upper stop blocks 6A and 6B similarly connected to the top plate 2 so as to protrude downwardly from the top plate 2. The upper stop blocks 6A and 6B are respectively received between adjacent pairs 5A and 5B or 5C and 5D of the lower stop blocks with a small defined block play clearance 15 therebetween. In other words, the upper stop blocks 6A and 6B are free to move in a back-and-forth horizontal direction Y to an extent determined by the block play clearance 15, and then further motion in this Y-direction is restrained when the upper blocks 6A and 6B respectively contact an adjacent one of the lower blocks 5A, 5B, 5C or 5D.

The lower blocks 5A, 5B, 5C and 5D each have a pin receiving hole 7A therein, while the upper blocks 6A and 6B respectively have pin receiving holes 7B therein. The holes 7A and 7B are aligned with each other. A restraining pin 8 is arranged to extend through the holes 7A and 7B in the blocks 5A, 6A and 5B, and respectively also through the holes 7A and 7B in the blocks 5C, 6B and 5D. Each pin receiving hole 7A has an inner diameter substantially matching the outer diameter of the restraining pin 8, so as to establish a tight friction fit of the restraining pin 8 in the pin receiving holes 7A. On the other hand, the pin receiving holes 7B have a larger diameter than the outer diameter of the restraining pin 8, so as to establish a pin free play clearance 16 between the pin 8 and the inner bore walls of the holes 7B. The pin 8 is preferably a uniform cylindrical pin with a smooth cylindrical surface, but it could have flutes or ribs provided on at least one end portion thereof for being positively fixed into the friction fitting pin receiving hole 7A. It would also be possible to use a pin having a different non-round cross-sectional shape, but then the machining of the pin receiving holes and the like becomes more complicated.

With this arrangement, the pins 8 are rigidly fixed to the lower blocks 5A, 5B, 5C and 5D, which in turn are rigidly fixed to the bottom plate 1, while the upper blocks 6A and 6B, and therewith the top plate 2, are allowed to float and move freely in a vertical uplift and downloading direction Z, and also in a horizontal side-to-side direction X. The motion in the directions X and Z is limited, however, by the extent of the pin free play clearance 16. Namely, excess motion in these directions is prevented or restrained when the restraining pin 8 bears against the inner bore walls of the pin receiving holes 7B.

As an alternative arrangement, the tight fitting holes 7A could be provided in the upper stop blocks 6A and 6B, while the larger diameter holes 7B establishing the pin free play clearance 16 could be provided in the lower stop blocks 5A, 5B, 5C and 5D. As a further alternative, it would be possible to provide four upper stop blocks cooperating with two lower stop blocks rather than the opposite arrangement shown in FIG. 1.

For the purpose of preventing rattling or movement of the parts of the tank weigh module during shipping, or even during installation on a tank if desired, a shipping chock 17 may be inserted with a wedging effect between the bottom plate 1 and the downwardly facing adjacent surface of each upper stop block 6A and 6B, as illustrated with dashed lines in FIG. 1. The shipping chocks 17 push the upper blocks 6A and 6B, and therewith the top plate 2 into the uppermost position in the Z direction, and thereby secure or fix the overall arrangement. The chocks 17 are simply removed after the final installation of the module, to release the top plate 2 into its operating free play condition.

A load cell 9 is arranged between the bottom plate 1 and the top plate 2. It should be noted that the load cell 9 has merely been schematically illustrated in section in FIG. 3, whereby the internal components of the load cell have been omitted and instead the load cell has been illustrated as a solid block, for the sake of simplicity. The load cell 9 can be any type of load cell known to persons of skill in the art. Preferably, a rocker pin 11 is used to introduce the loads from the top plate 2 into the load cell 9. For this purpose, the load cell 9 has a receiving bore 12 provided in the top surface thereof, and a receiver plate 13 of hardened heat treated steel is secured (e.g. welded) to the bottom surface of the top plate 2, whereby this receiver plate 13 similarly has a receiving bore 14 therein. The rocker pin 11 is loosely or freely placed so that its convex load introduction ends are received in the receiving bores 12 and 14.

Figure 2A:
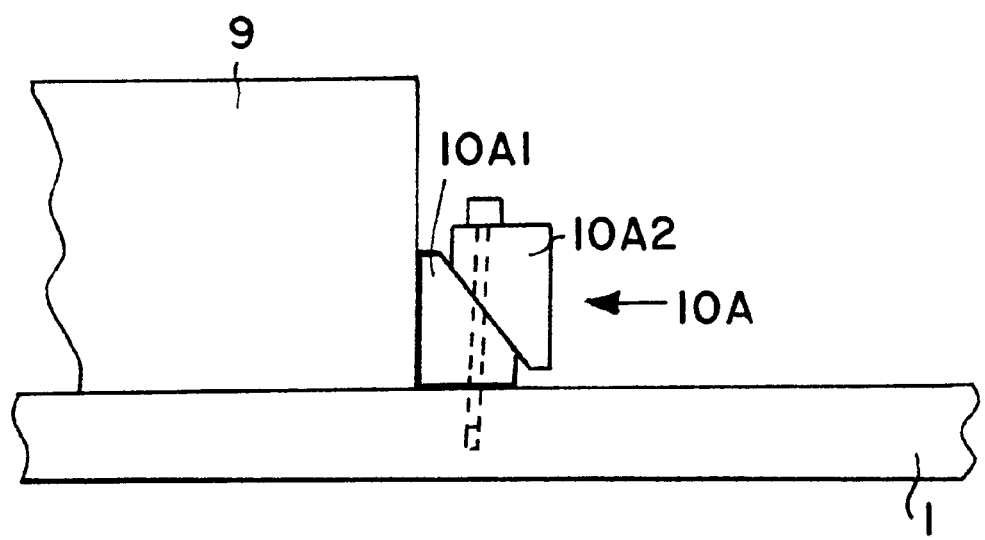
FIG. 2a is a detailed schematic side view of a two-part security pin that provides a wedging action to secure a load cell.

To achieve this, the top plate 2 is lifted or jacked up and then the load cell 9 and rocker pin 11 are slidingly pushed into position beneath the receiver plate 13, and particularly against two load cell securing pins 10B that have been rigidly fixed to the bottom plate 1 so as to protrude upwardly slightly above the plate 1. These pins 10B may simply be cylindrical pins driven into corresponding holes provided in the top of the bottom plate 1, or may be bolts protruding upwardly through bolt holes in the bottom plate 1. Once the load cell 9 has been properly located against the securing pins 10B, a third securing pin 10A is inserted into a corresponding hole provided in the bottom plate 1 to fix the load cell 9 in place. The removable securing pin 10A is preferably a two-part pin including two wedge-shaped pin parts 10A1 and 10A2 (also see FIG. 2A), that bear against each other with a wedging action or a cam action, so that this pin 10A in its installed condition exerts a radially inwardly directed securing force onto the load cell 9 and thereby wedges and presses the load cell 9 securely against the other two securing pins 10B. The three pins 10A and 10B are preferably uniformly angularly offset by 120° from each other.

If it ever becomes necessary to replace the load cell 9 after the tank weigh module is in its final installed location, it is simply necessary to remove at least one of the restraining pins 8, jack up the top plate 2 to a sufficient height to allow the rocker pin 11 to come out of the receiving bore 14, then remove the securing pin 10A, and slide out the defective or malfunctioning load cell 9. Installation of a replacement load cell simply involves a reversal of the preceding steps. It is not necessary to dismount the weigh module from the tank, or to completely disassemble the weigh module.

The materials and dimensions of the various components of the tank weigh module can be adapted as needed to the particular requirements of the application at hand. Especially the load capacity of the weigh module will affect the dimensions and material choice. For a typical tank weighing installation, the top and bottom plates 1 and 2, as well as the stop blocks 5A, 5B, 5C, 5D, 6A and 6B, are made of ordinary stainless steel, while the rocker pin 11 and the receiver plate 13 are made of hardened, heat treated alloy steel or particularly stainless steel to assure positive, accurate load transmission without deformation of the load transfer surfaces. For this purpose also, the receiving bore 12 in the load cell 9 is typically also hardened steel.

Typical load capacities for the weigh module are expected to be 20,000 lbs., 50,000 lbs., and 100,000 lbs., for example. For these load capacities, the overall outside dimensions of the weigh module are generally expected to be in the range of 7 to 10 inches wide, 10 to 14 inches long, and 4½ to 7 inches high for typical applications. Also for these load capacities, the restraining pins 8 will be expected to made of hardened heat treated steel and have a diameter in the range from about ⅝ inch to 1½ inches. The number of pins 8 used in a particular embodiment will also be selected based on the load capacity.

The dimensions of the pin free play clearance 16 and the block free play clearance 15 also depend on the requirements of the particular application, and the load capacity of the weigh module. The vertical uplift restraint in the Z-direction must be less than the depth of the receiving bore 14, or more particularly less than the lesser of the depth of the receiving bore 14 and the receiving bore 12, to ensure that the rocker pin 11 cannot become displaced or dislodged out of its proper position between the receiver plate 13 and the load cell 9 in the event of an excessive uplift being applied to the top plate 2. Thus, the pin free play clearance 16 must be accordingly limited. Also, the extent to which the top plate 2 can be allowed to tilt, or shift side-to-side or back-and-forth, relative to the bottom plate 1 must be limited or restrained to prevent the sides of the rocker pin 11 from contacting the sides of the receiving bores 12 and 14. Both the pin free play clearance 16 and the block free play clearance 15 must be limited in view of this limitation on the tilting of the rocker pin. The clearances must also be limited so as to provide the restraint necessary for the particular application, e.g. so as to restrain the tank against leaning so far that it tips over. A typical dimension of the clearance 15 and of the clearance 16, respectively, is expected to be in a range from about 3/16 inch to about 5/16 inch for many common applications.

Figure 4:
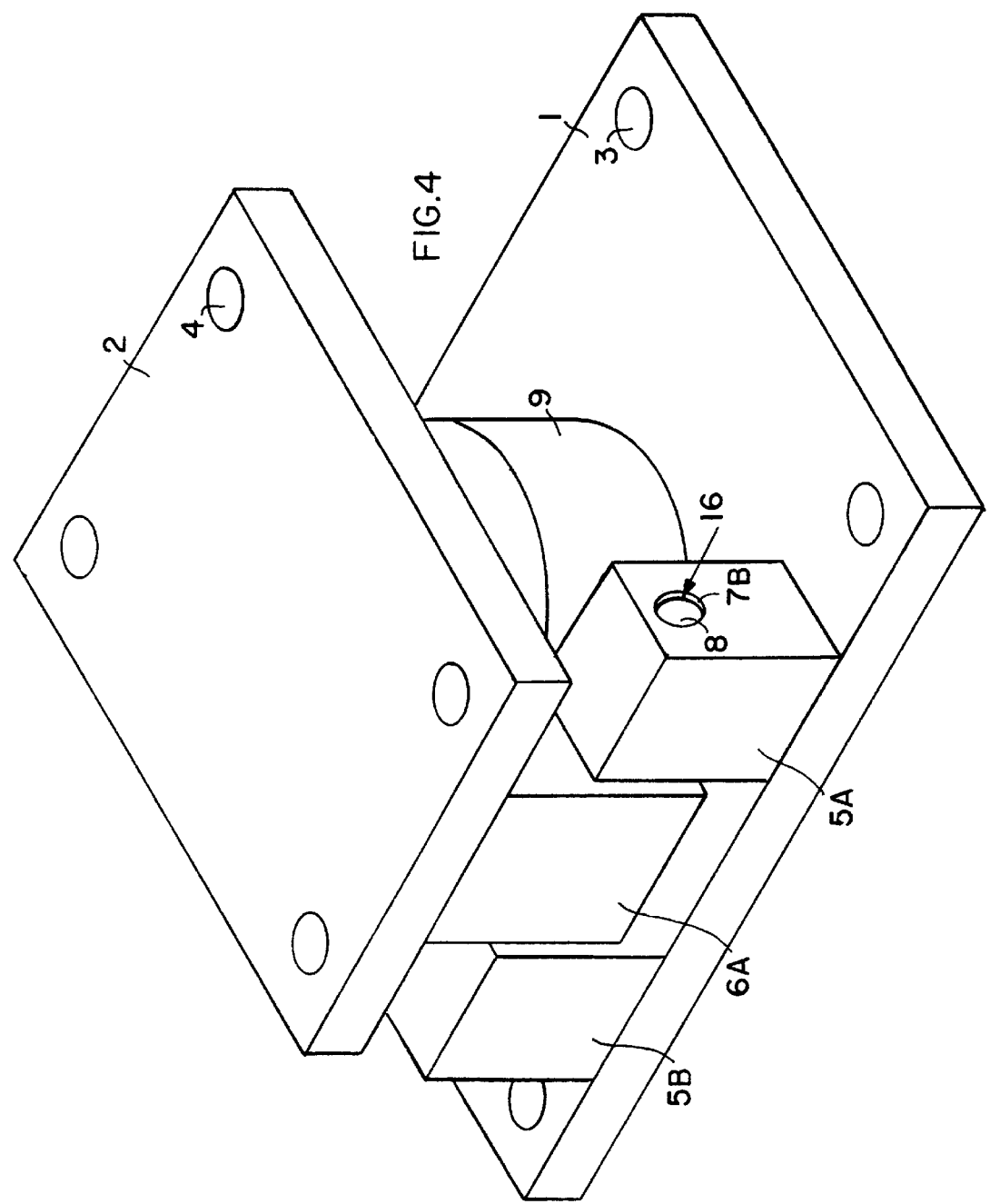
FIG. 4 is a schematic perspective view of a second embodiment of a tank weigh module according to the invention.

FIG. 4 illustrates a second embodiment of a weigh module according to the invention, which has been simplified by omitting some of the elements or features of the first embodiment discussed above, while the similar or corresponding retained elements are designated with the same reference numbers. In this simpler embodiment, there are only two lower stop blocks 5A and 5B protruding from one edge of the bottom plate 1, and a single upper stop block 6A protruding from one edge of the top plate 2, with a single pin 8 received in the holes 7A and 7B provided in the stop blocks. In this embodiment, the larger diameter pin receiving holes 7B having a free play clearance 16 relative to the pin 8 are provided in the lower stop blocks 5A and 5B, while the tight or friction fitting hole 7A is provided in the upper stop block 6A, as an example.

The distal or right-hand edge of the top plate 2 as shown in FIG. 4 is not connected to the bottom plate 1. Instead, the top plate 2 remains freely tiltable relative to the bottom plate 1, about the axis of the restraining pin 8, which acts as a hinge. Nonetheless, the present embodiment of the weigh module provides the desired range of free play motion, while preventing or restraining excessive motion in the back-and-forth Y-direction, the side-to-side X-direction, and the uplift Z-direction, as well as tilting about the X-axis and twisting about the Z-axis. A restraint against excess tilting about the Y-axis, i.e. about the axis of the restraining pin 8, is achieved by the cooperative arrangement of at least two of these weigh modules connected to the tank or other vessel being weighed. As long as the other weigh modules are not oriented in exactly the same orientation as the first weigh module, then a restraint of the tank in all possible motion and tilting directions will be achieved. The assembly and installation of the tank weigh module according to the second embodiment of FIG. 4 is even simpler than that of FIG. 1, because the top plate 2, in the uninstalled condition, can simply be lifted and tilted upward to allow the load cell 9 to be positioned thereunder. FIG. 4 illustrates that the load cell 9 can be secured to the bottom plate 1 in any other desired manner, not using the three securing pins 10A and 10B as shown in FIG. 1. For example, in the embodiment of FIG. 4, the load cell 9 can be secured to the bottom plate 1 by bolts passing through from the bottom side of the bottom plate 1.

Referring now to FIG. 5, a third embodiment of the present weigh module comprises two lower stop blocks 5A and 5C connected to the bottom plate, two upper stop blocks 6A and 6B connected to the top plate 2, and two restraining pins 8, which are particularly embodied as restraining bolts 8'. In this embodiment, the restraining bolts 8' provide not only the restraining function in the positive and negative X-direction and the positive and negative Z-direction, but also in the positive Y-direction. Namely, when the top plate 2 moves in the negative Y-direction relative to the bottom plate 1, the upper stop blocks 6A and 6B will come to bear against the lower stop blocks 5A and 5C. However, since there are no lower stop blocks on the opposite sides of the upper stop blocks 6A and 6B, the restraining bolts 8' must somehow restrain the upper stop blocks 6A and 6B from excessive motion in the positive Y-direction.

This can be achieved in various ways. As shown on the left side of the weigh module in FIG. 5, the restraining pin 8, particularly embodied as a restraining bolt 8', can be threaded and thereby firmly secured into a threaded hole provided in the upper stop block 6A, while the shaft of the bolt 8' passes through a larger diameter clearance hole in the lower stop block 5A, with the bolt head 8A protruding over the front outer surface of the lower stop block 5A. Thus, as the top plate 2 moves back and forth, the bolt 8' moves with free play in the larger diameter hole provided in the lower stop block 5A, but when the maximum permissible travel in the positive Y-direction is reached, the bolt head 8A is stopped against the lower stop block 5A.

As an alternative, the orientation of the bolt 8' is reversed as shown on the right side of the weigh module in FIG. 5. In such a configuration, the threaded hole 7C is provided in the lower stop block 5C, while a larger diameter clearance bore is provided through the upper stop block 6B, and the bolt head 8A comes to bear against the outer back surface of the upper stop block 6B. In either orientation of the bolt 8', the restraint or limitation of travel in the other directions is provided in a similar manner as discussed above in connection with the preceding embodiments.

FIG. 6 shows a further simplified embodiment of a weigh module according to the invention. This weigh module comprises only a single lower stop block 5A connected to the bottom plate 1, and a single upper stop block 6A connected to the top plate 2. As in the above embodiments, one of the blocks 5A or 6A has a larger diameter hole 7B providing a pin free play clearance 16 while the other one of the blocks has a tight fitting hole 7A. Alternatively, both of the holes could have a loose fit providing a free play clearance, but then the restraining effect would not be as positively defined. Restraint in the X- and Z-directions as well as tilting about the X- and Z-axes is provided by the restraining pin 8 closing the pin free play clearance and butting against the inner bore walls of the hole 7B. Tilting about the Y-axis is restrained by the cooperative arrangement of another weigh module in the manner discussed above in connection with the embodiment of FIG. 4.

In the embodiment of FIG. 6, motion of the top plate 2 relative to the bottom plate 1 in the positive Y-direction is restrained in a manner generally corresponding to that discussed above in connection with FIG. 5. As an alternative to using restraining bolts 8' as discussed with reference to FIG. 5, it is possible to use cotter pins or other securing pins 18 as shown in FIG. 6. Here, a first cotter pin 18 rigidly secures the restraining pin 8 in the upper stop block 6A to ensure that it cannot be pulled out of the hole provided in the block 6A. Second cotter pin 18 similarly passes through a cross-hole in the pin 8, but in a portion of the pin 8 protruding out from the lower stop block 5A, so that this cotter pin 18 serves the same restraining function as the bolt head 8A with respect to the lower stop block 5A as discussed above in connection with FIG. 5.

In each of the above embodiments, the axis of the restraining pin 8 is arranged parallel to the plane of the top and bottom plates. With this arrangement, each restraining pin is subjected to shear loading as the primary or only restraining mode. In the embodiments of FIGS. 1 an 4 there is no tensile loading and no compression loading applied to the pin. In the embodiments of FIGS. 5 and 6, there is a tensile loading of the pin only to restrain motion of the top plate 2 in the positive Y-direction. In this manner, the most substantial overload forces that would be applied to the weigh module in the event of a tilting or tipping of the tank being weighed, are all carried as shear loads in the respective restraining pins 8. The pins are particularly strong against shear loads. The required load capacity can be easily calculated for the application at hand, and it is a simple matter to provide the appropriate number of restraining pins having the appropriate diameter to withstand the required loads for any given application.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A weigh module adapted to receive a load cell and transfer forces into the load cell, said weigh module comprising:

a first plate unit including a first plate and a first stop block that is rigidly connected to and protrudes away from said first plate and that has a first pin receiving hole therein;

a second plate unit including a second plate and a second stop block that is rigidly connected to and protrudes away from said second plate and that has a second pin receiving hole therein; and a first restraining pin that is received and retained in said first and second receiving holes; wherein:

said first and second plate units are arranged facing opposite one another with said first stop block protruding toward said second plate and said second stop block protruding toward said first plate, with said first and second stop blocks adjacent one another such that said first and second pin receiving holes are aligned with each other to receive said first restraining pin therein, and adapted to receive the load cell between said first and second plates;

at least one of said first and second pin receiving holes has an inner dimension that is larger than an outer dimension of said first restraining pin received within said inner dimension so as to leave a radial free play clearance therebetween;

said first restraining pin is retained with respect to said first and second stop blocks and has such a length so as to allow an axial free play clearance along said first restraining pin between said first and second stop blocks;

said first and second plate units can tilt relative to each other about said first restraining pin;

said first and second plate units can move laterally relative to each other in directions in an XZ plane perpendicular to an axis of said first restraining pin within a range of said radial free play clearance; and said first and second plate units can move laterally relative to each other in a Y direction parallel to said axis of said first restraining pin within a range of said axial free play clearance.

2. The weigh module according to claim 1, wherein said axis of said first restraining pin extends parallel to a first plane along which said first plate extends and to a second plane along which said second plate extends.

3. The weigh module according to claim 1, wherein said first restraining pin provides the only interconnection between said first and second plate units.

4. The weigh module according to claim 1, wherein:

said first plate unit further includes a third stop block that is rigidly connected to and protrudes away from said first plate and that has a third pin receiving hole therein;

said second plate unit further includes a fourth stop block that is rigidly connected to and protrudes away from said second plate and that has a fourth pin receiving hole therein;

said weigh module further comprises a second restraining pin that is received and retained in said third and fourth pin receiving holes;

said third and fourth stop blocks are adjacent one another such that said third and fourth pin receiving holes are aligned with each other to receive said second restraining pin therein; and said second restraining pin extends parallel to said first restraining pin.

5. The weigh module according to claim 4, wherein said first and second restraining pins provide the only interconnections between said first and second plate units.

6. The weigh module according to claim 1, wherein:

said first plate unit further comprises a third stop block that is rigidly connected to and protrudes away from said first plate at a spacing distance away from said first stop block, and that has a third pin receiving hole therein coaxially aligned with said first pin receiving hole;

said second stop block is received in said spacing distance between said first and third stop blocks; and said first restraining pin is further received in said third pin receiving hole.

7. The weigh module according to claim 6, wherein said first restraining pin provides the only interconnection between said first and second plate units.

8. The weigh module according to claim 1, wherein:

said first plate unit further comprises a third stop block that is rigidly connected to and protrudes away from said first plate at a spacing distance away from said first stop block, and that has a third pin receiving hole therein coaxially aligned with said first pin receiving hole;

said second stop block is received in said spacing distance between said first and third stop blocks;

said first restraining pin is further received in said third pin receiving hole;

said first plate unit further includes fourth and fifth stop blocks that are rigidly connected to and protrude away from said first plate at a spacing distance apart from each other, and that respectively have fourth and fifth pin receiving holes therein coaxially aligned with each other;

said second plate unit further includes a sixth stop block that is rigidly connected to and protrudes away from said second plate, that has a sixth pin receiving hole therein, and that is received in said spacing distance between said fourth and fifth stop blocks; and said weigh module further comprises a second restraining pin that is received and retained in said fourth, fifth and sixth pin receiving holes.

9. The weigh module according to claim 8, wherein said second restraining pin extends parallel to said first restraining pin.

10. The weigh module according to claim 8, wherein said first and second restraining pins provide the only interconnections between said first and second plate units.

11. The weigh module according to claim 1, further comprising a load cell and a rocker pin arranged mechanically in series between said first plate and said second plate.

12. The weigh module according to claim 11, wherein said first plate has an entirely flat first surface facing toward said second plate, said load cell rests on said flat first surface, said second plate has a recess in a second surface thereof facing toward said first plate, and an end of said rocker pin is received in said recess.

13. The weigh module according to claim 1, further comprising a first securing pin, a second securing pin and a third securing pin that are each connected to said first plate and protrude therefrom toward said second plate, wherein said securing pins are so arranged and positioned so that they are adapted to receive a load cell between said securing pins and secure the load cell to said first plate.

14. The weigh module according to claim 13, wherein said first and second securing pins are fixedly connected to said first plate, and said third securing pin is removably connected to said first plate.

15. The weigh module according to claim 14, wherein said third securing pin has a wedge configuration that is adapted to exert a securing force onto a load cell that is received between said securing pins.

16. The weigh module according to claim 13, wherein said securing pins are arranged along an imaginary circle at angular spacings of 120° from each other around said circle.

17. A weigh module comprising:

a first plate;

a second plate spaced apart from said first plate;

at least one stop block and at least one restraining pin received in said stop block, wherein said at least one stop block and said at least one restraining pin movably connect said first and second plates to each other to allow limited tilting, lateral and vertical relative motion therebetween;

a load cell received between said first and second plates; and first, second and third securing pins that are connected to said first plate and protrude toward said second plate, and that engage a circumference of said load cell and secure said load cell to said first plate.

18. The weigh module according to claim 17, wherein said first and second securing pins are fixedly connected to said first plate, and said third securing pin is removably connected to said first plate.

19. The weigh module according to claim 18, wherein said third securing pin has a wedge configuration, whereby said third securing pin exerts a radially inwardly directed securing force onto said circumference of said load cell to press said load cell securely against said first and second securing pins.

20. The weigh module according to claim 17, wherein said securing pins are arranged along an imaginary circle at angular spacings of 120° from each other around said circle.

* * * * *